US011801760B2

(12) United States Patent
Yun et al.

(10) Patent No.: US 11,801,760 B2
(45) Date of Patent: Oct. 31, 2023

(54) METHOD AND APPARATUS FOR CONTROLLING TORQUE VECTORING OF XEV

(71) Applicants: Hyundai Motor Company, Seoul (KR); Kia Corporation, Seoul (KR)

(72) Inventors: Sok Young Yun, Whasung-Si (KR); Ye Ahn Yoon, Whasung-Si (KR); Sang Hyun Jeong, Whasung-Si (KR); Joo MI Park, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/984,619

(22) Filed: Nov. 10, 2022

(65) Prior Publication Data

US 2023/0150374 A1 May 18, 2023

(30) Foreign Application Priority Data

Nov. 18, 2021 (KR) ........................ 10-2021-0159584

(51) Int. Cl.
  *B60L 3/10* (2006.01)
  *B60L 15/20* (2006.01)

(52) U.S. Cl.
  CPC ............ *B60L 15/2036* (2013.01); *B60L 3/102* (2013.01); *B60L 3/104* (2013.01); *B60L 2240/12* (2013.01); *B60L 2240/423* (2013.01); *B60L 2240/461* (2013.01); *B60L 2240/465* (2013.01)

(58) Field of Classification Search
  CPC ...... B60L 15/2036; B60L 3/102; B60L 3/104; B60L 2240/12; B60L 2240/423; B60L 2240/461; B60L 2240/465; B60L 2240/14; B60L 2240/24; B60L 2250/26; B60L 2250/28; B60L 15/20; B60L 2240/421; Y02T 10/72; B60Y 2200/91; B60Y 2300/28; B60Y 2400/303

See application file for complete search history.

(56) References Cited

U.S. PATENT DOCUMENTS

2017/0246957 A1* 8/2017 Ienaga ................. B60K 17/356

FOREIGN PATENT DOCUMENTS

| CN | 106740267 A | * | 5/2017 | |
| DE | 102016202322 A1 | * | 8/2016 | .......... B60W 10/184 |
| JP | 2017184615 A | * | 10/2017 | .......... B60L 15/2036 |

* cited by examiner

*Primary Examiner* — Justin Holmes
(74) *Attorney, Agent, or Firm* — MORGAN, LEWIS & BOCKIUS LLP

(57) ABSTRACT

A method for controlling torque vectoring of an xEV includes detecting vehicle speed information using speed sensors mounted in the xEV, and estimating a vehicle speed of the xEV in driving based on the detected vehicle speed information, setting a state of the xEV based on the estimated vehicle speed, determining whether there is an intervention request based on the set state of the xEV, detecting a steering angle of the xEV when the intervention request is rejected, and when the detected steering angle of the xEV is within a predetermined reference angle range, determining the xEV as being in a first slip state in which the xEV slips in a longitudinal direction, and resetting the vehicle speed of the xEV through output of a torque vectoring (TV) motor mounted in the xEV.

19 Claims, 6 Drawing Sheets

METHOD AND APPARATUS FOR CONTROLLING TORQUE VECTORING OF XEV

CROSS-REFERENCE TO RELATED APPLICATION

The present application claims priority to Korean Patent Application No. 10-2021-0159584, filed on Nov. 18, 2021, the entire contents of which is incorporated herein for all purposes by this reference.

BACKGROUND OF THE PRESENT DISCLOSURE

Field of the Present Disclosure

The present disclosure relates to a method and apparatus for controlling torque vectoring of an xEV which may improve traction control performance through vehicle state estimation and an intervention torque.

Description of Related Art

In general, xEVs are future vehicles which employs a motor as a driving source and may thus promote exhaust gas reduction and fuel efficiency improvement.

FIG. 1 is a diagram illustrating one example of the configuration of a powertrain apparatus configured to transmit power of a general xEV.

Referring to FIG. 1, the powertrain apparatus of the xEV includes a first motor configured to control shift of the speed of the vehicle, a torque vectoring (TV) motor configured to control a torque, a pair of planetary gear sets, and a TV planetary gear set.

The first motor, i.e., a driving motor, is connected to a planet carrier $C_1$ of a first planetary gear set and a planet carrier $C_2$ of a second planetary gear set, and transmits driving force using the first and second planet carriers.

The TV motor is connected to a sun gear S of the TV planetary gear set, is connected to a ring gear $R_2$ of the second planetary gear set via a planet carrier C of the TV planetary gear set, and controls torque vectoring +GTtv via the planet carrier $C_2$ of the second planetary gear set.

Furthermore, the TV motor is connected to the sun gear S of the TV planetary gear set, is connected to a ring gear $R_2$ of the second planetary gear set via the planet carrier C of the TV planetary gear set, and controls torque vectoring −GTtv via the planet carrier $C_2$ of the second planetary gear set, a sun gear $S_2$ of the second planetary gear set, a sun gear $S_1$ of the first planetary gear set, and the planet carrier $C_1$ of the first planetary gear set.

FIG. 2 is a diagram illustrating EV traction control in a general xEV.

Referring to FIG. 2, the general xEV includes a vehicle control unit (VCU), a motor control unit (MCU), and a traction control system (TCS).

The vehicle control unit (VCU) receives an accelerator signal generated by detecting operation of an accelerator pedal, a brake signal generated by detecting operation of a brake pedal, front and rear wheel speeds, an acceleration sensor value and an intervention request from the traction control system (TCS), determines a total demand torque depending on a driver's driving intention, calculates a motor torque command in consideration of battery and electric field load situations, determines an intervention situation by an external control unit, and controls a driving motor torque command converted from the demand torque.

The motor control unit (MCU) receives the motor torque command from the vehicle control unit (VCU), controls torque and vibration, and provides data regarding a motor speed to the vehicle control unit (VCU) based on the torque and vibration.

The traction control system (TCS) may determine the state of the vehicle, may control stability of the vehicle, and may make a request for intervention to the vehicle control unit (VCU). The traction control system (TCS) is a kind of safety system which may automatically control a brake, a motor torque, etc., when a vehicle starts or accelerates on a snowy road, an icy road or an asymmetric road, and may thus prevent the wheels of the vehicle from idling and improve vehicle handling performance.

Meanwhile, when the vehicle starts or accelerates on a slippery road and thus tires slip due to generation of excess driving force, the traction control system (TCS) makes a request for intervention control to the vehicle control unit (VCU) so that torque reduction control for driving is achieved, and in the instant case, control performance of the vehicle may be rapidly reduced when the vehicle enters a control limit situation.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and apparatus of controlling torque vectoring of an xEV that substantially obviate one or more problems due to limitations and disadvantages of the related art.

Various aspects of the present disclosure are directed to providing a method and apparatus of controlling torque vectoring of an xEV which may improve traction control performance through vehicle state estimation and an intervention torque.

Additional advantages, objects, and features of the present disclosure will be set forth in part in the description which follows and in part will become apparent to those having ordinary skill in the art upon examination of the following, or may be learned from practice of the present disclosure. The objectives and other advantages of the present disclosure may be realized and attained by the structure particularly pointed out in the written description and claims hereof as well as the appended drawings.

To achieve these objects and other advantages and in accordance with the present disclosure, as embodied and broadly described herein, a method for controlling torque vectoring of an xEV includes detecting vehicle speed information using speed sensors mounted in the xEV, and estimating a vehicle speed of the xEV in driving based on the detected vehicle speed information, setting a state of the xEV based on the estimated vehicle speed, determining whether there is an intervention request based on the set state of the xEV, detecting a steering angle of the xEV when the intervention request is rejected, and when the detected steering angle of the xEV is within a predetermined reference angle range, determining the xEV as being in a first slip state in which the xEV slips in a longitudinal direction, and resetting the vehicle speed of the xEV through output of a torque vectoring (TV) motor mounted in the xEV.

In another aspect of the present disclosure, an apparatus of controlling torque vectoring of an xEV includes a vehicle control unit configured to estimate a vehicle speed of the xEV and a state of the xEV using speed sensors mounted in the xEV, a motor control unit configured to receive a motor torque command from the vehicle control unit and to control a torque of a motor, and a traction control system configured to estimate the state of the xEV and to make a request for intervention to the vehicle control unit based on the estimated state of the xEV, wherein the vehicle control unit is configured to determine whether there is an intervention request based on the set state of the xEV, detects a steering angle of the xEV when the intervention request is rejected, and when the detected steering angle of the xEV is within a predetermined reference angle range, determines the xEV as being in a first slip state in which the xEV slips in a longitudinal direction, and resets the vehicle speed of the xEV through output of a torque vectoring (TV) motor mounted in the xEV.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
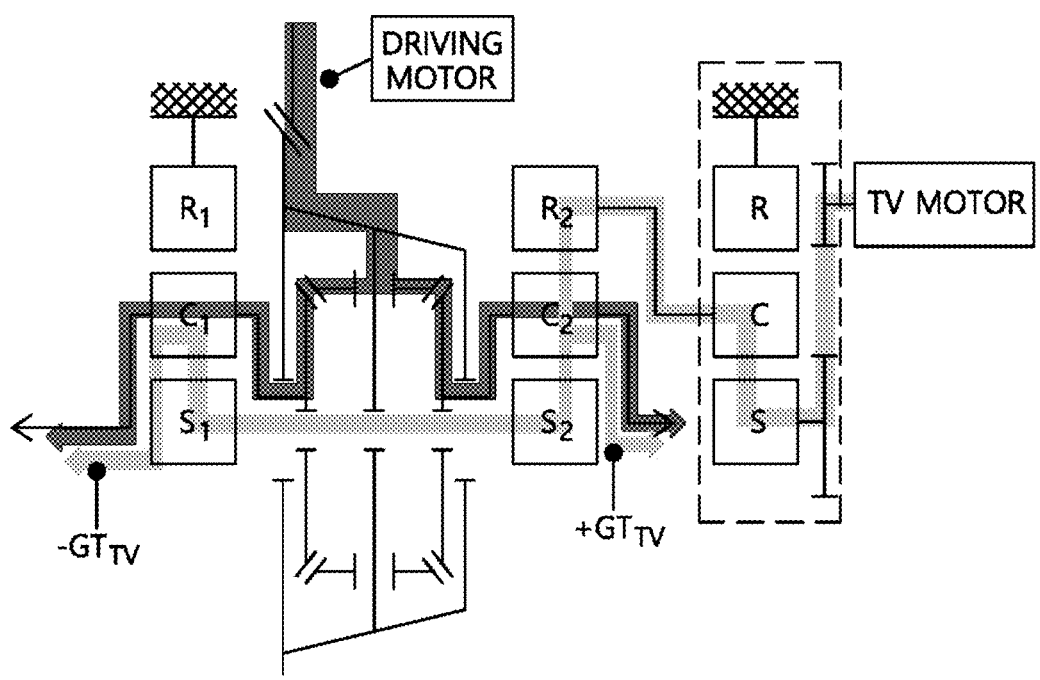
FIG. 1 is a diagram illustrating one example of the configuration of a powertrain apparatus configured to transmit power of a general xEV.
Figure 2:
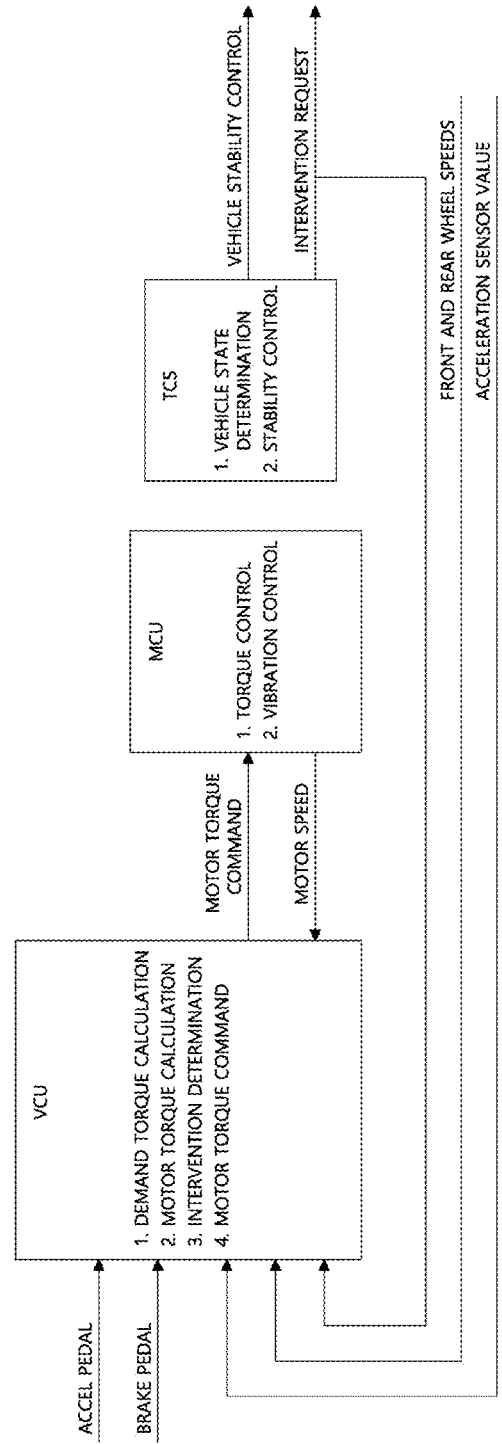
FIG. 2 is a diagram illustrating EV traction control in a general xEV.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Reference will now be made in detail to exemplary embodiments of the present disclosure, examples of which are illustrated in the accompanying drawings. However, the present disclosure of the present disclosure is not limited to the exemplary embodiments set forth herein and may be variously modified. In the drawings, to clearly describe the present disclosure, descriptions of elements which are not related to the present disclosure are omitted, and the same or similar elements are denoted by the same reference numerals even when they are depicted in different drawings.

In the following description of the embodiments, it will be understood that, when a part "includes" an element, the part may further include other elements, and does not exclude the presence of such other elements, unless stated otherwise. Furthermore, in the following description of the embodiments, parts denoted by the same reference numerals indicate the same elements.

Furthermore, a unit or a control unit included in names, such as a vehicle control unit (VCU), is just a term widely used to name a controller which is configured to control a specific function of a vehicle, and does not mean a generic functional unit. For example, each control unit may include a communication device configured to communicate with other control units or sensors, a memory configured to store operating systems, logic commands, input and output information, etc., and at least one processor configured to perform determination, calculation, judgement, etc. necessary to control a function assigned to the control unit, to control the function.

Embodiments of the present disclosure suggest a method and apparatus of controlling torque vectoring of an xEV which may improve traction control performance through vehicle state estimation and an intervention torque.

Before a description of a method for controlling torque vectoring of an xEV according to various exemplary embodiments of the present disclosure, the structure and the control system of an apparatus of controlling torque vectoring of the xEV will be described.

Figure 3:
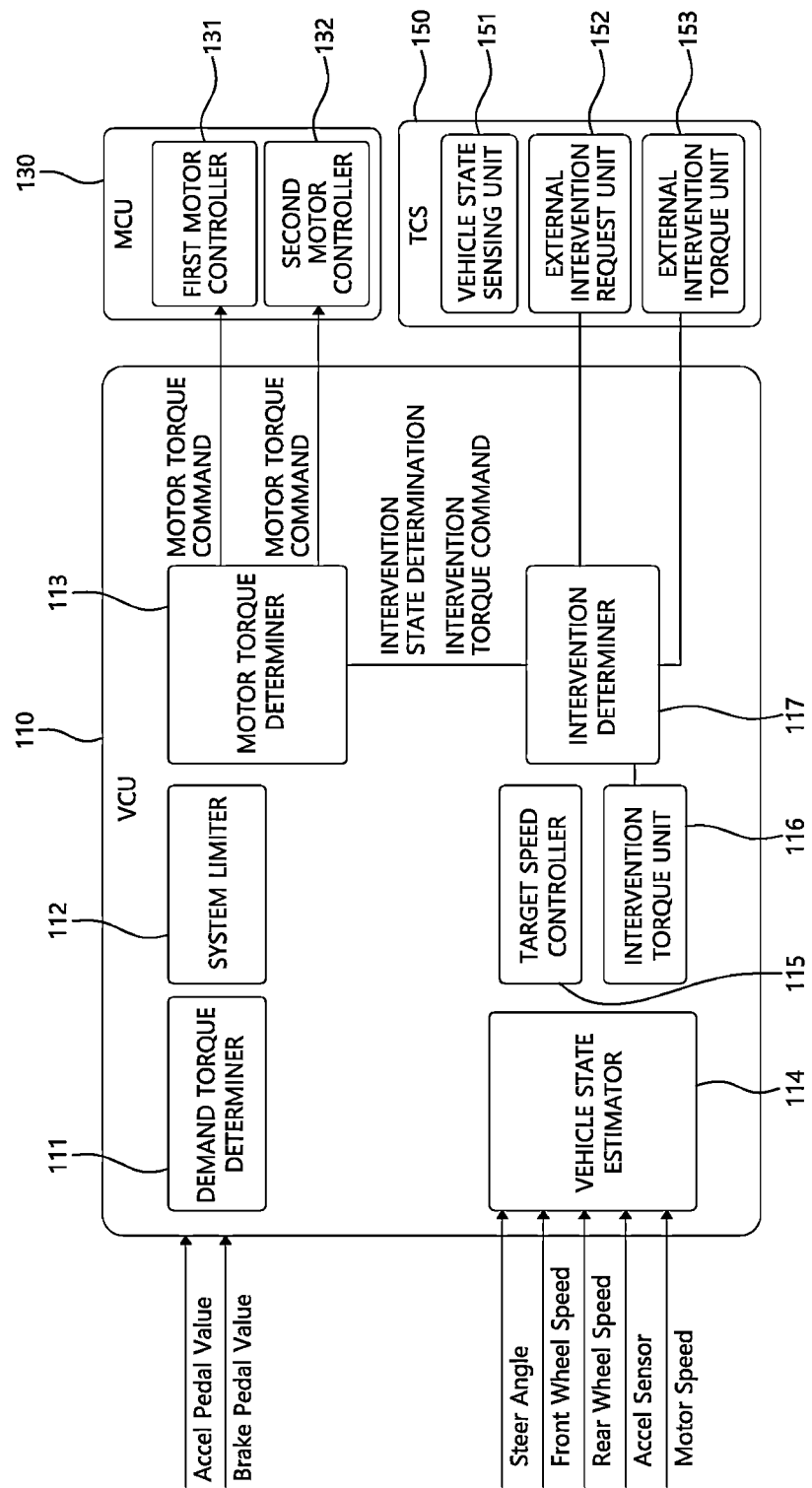
FIG. 3 is a diagram illustrating an apparatus of controlling torque vectoring of an xEV according to an exemplary embodiment of the present disclosure.

FIG. 3 is a diagram illustrating the apparatus of controlling torque vectoring of the xEV according to various exemplary embodiments of the present disclosure.

Referring to FIG. 3, the apparatus of controlling torque vectoring of the xEV according to various exemplary embodiments of the present disclosure may include a vehicle control unit (VCU) 110, a motor control unit (MCU) 130 and a traction control system (TCS) 150.

The vehicle control unit (VCU) 110 may receive an accelerator pedal value obtained by detecting operation of an accelerator pedal, a brake pedal value obtained by detecting operation of a brake pedal, a steering angle obtained by detecting operation of a steering wheel, front wheel speeds obtained by detecting operation of front wheels, rear wheel speeds obtained by detecting operation of rear wheels, an acceleration detected by an acceleration sensor, a motor speed obtained by detecting operation of a motor, etc., may determine a total demand torque depending on a driver's driving intention, may determine a motor torque command in consideration of battery and electric field load situations, may determine an intervention situation by an external control unit, and may control a driving motor torque command converted from the demand torque.

The vehicle control unit (VCU) 110 may include a demand torque determiner 111, a system limiter 112, a motor torque determiner 113, a vehicle state estimator 114, a target speed controller 115 and an intervention controller 116 and 117.

The demand torque determiner 111 may receive the accelerator pedal value obtained by detecting operation of the accelerator pedal and the brake pedal value obtained by detecting operation of the brake pedal, may determine a demand torque, and may determine the demand torque of the xEV based on the determined demand torque.

The system limiter 112 may control the battery power of the xEV, and may limit the motor torque of a first motor or second motors.

The vehicle state estimator 114 may receive the steering angle obtained by detecting operation of the steering wheel, the front wheel speeds obtained by detecting operation of the front wheels, the rear wheel speeds obtained by detecting operation of the rear wheels, the acceleration detected by the acceleration sensor, the motor speed obtained by detecting operation of the motor, may analyze the received information, and may estimate the state of the xEV, which is driving now, based on result values obtained by analysis. The vehicle state estimator 114 may generate various estimated data, and may provide the estimated data to other elements. A detailed description thereof will be provided below.

The motor torque determiner 113 may receive the demand torque determined by the demand torque determiner 111, various data of the xEV, which is driving now, estimated by the vehicle state estimator 114, the front wheel speeds and the rear wheel speeds determined by the target speed controller 115, and an intervention state determination and an intervention torque command from the intervention controller 116 and 117, may analyze these data, and may determine the motor torque based on result values obtained by analysis. The motor torque determiner 113 may provide a command for the determined motor torque to the motor control unit (MCU) 130.

The target speed controller 115 may receive and analyze various data of the xEV, which is driving now, from the vehicle state estimator 114, and may set target speeds of the front wheel speeds and the rear wheel speeds estimated based on result values obtained by analysis.

The intervention controller 116 and 117 may provide the intervention state determination and the intervention torque to the motor torque determiner 113.

The intervention controller 116 and 117 may include an intervention torque unit 116 and an intervention determiner 117.

The intervention torque unit 116 may receive the various data estimated by the vehicle state estimator 114, may determine an intervention torque based on the received data, and may provide the determined intervention torque to the intervention determiner 117.

The intervention determiner 117 may receive an intervention request and an intervention torque from the traction control system (TCS) 150, may receive the intervention torque provided by the intervention torque unit 116 of the vehicle control unit (VCU) 110, may analyze these data, may determine the intervention state based on result values obtained by analysis, and may transmit an intervention torque command to the motor torque determiner 113.

The above-described intervention controller 116 and 117 may employ both traditional TCS control and TCS control due to electrification, and may secure rapid driving performance through responsiveness differentiation. That is, the intervention controller 116 and 117 may simultaneously use an external intervention torque unit 153 (i.e., responsiveness by dynamic characteristics due to hydraulic pressure) of the traction control system (TCS) 150 which utilizes hydraulic pressure in traction control and the intervention torque unit 116 (i.e., responsiveness by dynamic characteristics due to electrification) of the vehicle control unit (VCU) 110 which utilizes an electric motor in traction control, and may easily secure rapid driving performance through responsiveness differentiation.

The motor control unit (MCU) 130 may receive the motor torque command from the vehicle control unit (VCU) 110, and may control the torque of the motor.

The motor control unit (MCU) 130 may include a first motor controller 131 connected to the first motor to detect and control operation of the first motor in real time, and a second motor controller 132 connected to the second motors to detect and control operation of the second motor in real time. The first motor may be referred to as a main driving motor or a main motor, and the second motors may be referred to as torque vectoring (TV) motors. The torque vectoring (TV) motors may include at least one motor, and may be provided to correspond to the respective the wheels of the xEV.

The motor control unit (MCU) 130 may substantially simultaneously receive a first motor torque command a second motor torque command provided from the motor torque determiner 113, and may control the main driving motor, i.e., the first motor, and the torque vectoring (TV) motors, i.e., the second motors.

The first motor controller 131 may receive the first motor torque command from the motor torque determiner 113 of the vehicle control unit (VCU), and may control the first motor based on the first motor torque command. The first motor torque command may be referred to as a driving motor torque command or a main driving torque command. The first motor controller 131 may control the first motor operated by the first motor torque command, and may provide data regarding the speed of the first motor to the vehicle control unit (VCU) 110 based on the first motor torque command.

The second motor controller 132 may receive the second motor torque command from the motor torque determiner 113 of the vehicle control unit (VCU), and may control the second motors based on the second motor torque command. That is, the second motor controller 132 may more rapidly and accurately distribute torque to the respective wheels of the xEV by controlling a plurality of torque vectoring (TV) motors, each of which is provided at a corresponding one of the respective wheels of the xEV. However, the present disclosure is not limited thereto, and the plurality of torque vectoring (TV) motors may be provided in number less than the number of the wheels of the xEV, and the torque may be distributed to the wheels of the xEV to correspond to the second motor torque command.

The second motor torque command may be referred to as a vectoring motor torque command or a vectoring torque command. The second motor controller 132 may control the second motors operated by the second motor torque command, and may provide data regarding the speeds of the second motors to the vehicle control unit (VCU) 110 based on the second motor torque command. The traction control system (TCS) 150 may estimate the state of the vehicle, and may make a request for intervention based on the estimated state of the vehicle.

The traction control system (TCS) 150 may include a vehicle state sensing unit 151, an external intervention request unit 152 and the external intervention torque unit 153.

The vehicle state sensing unit 151 may receive various data regarding the xEV, which is driving now, from the vehicle control unit (VCU) 110, and may estimate or detect the state of the xEV.

The external intervention request unit 152 may make a request for intervention to the vehicle control unit (VCU) 110 based on the estimated state of the xEV.

The external intervention torque unit 153 may determine a torque for intervention based on the estimated state of the xEV, and may provide the determined torque for intervention to the vehicle control unit (VCU) 110.

The external intervention request unit 152 and external intervention torque unit 153, which have been described above, may be connected to the intervention determiner 117 of the vehicle control unit (VCU) 110, and may transmit or receive various data regarding intervention.

Figure 4:
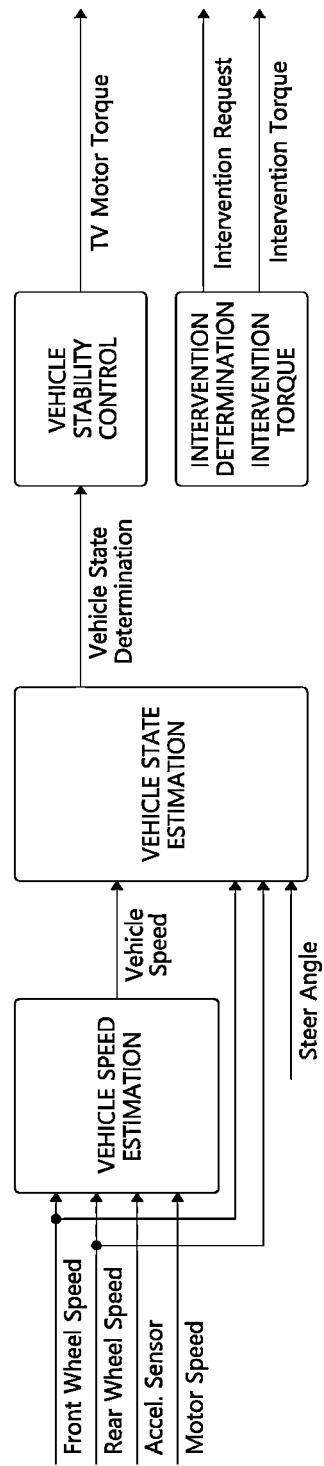
FIG. 4 and FIG. 5 are diagrams illustrating a vehicle control unit according to an exemplary embodiment of the present disclosure.
Figure 5:
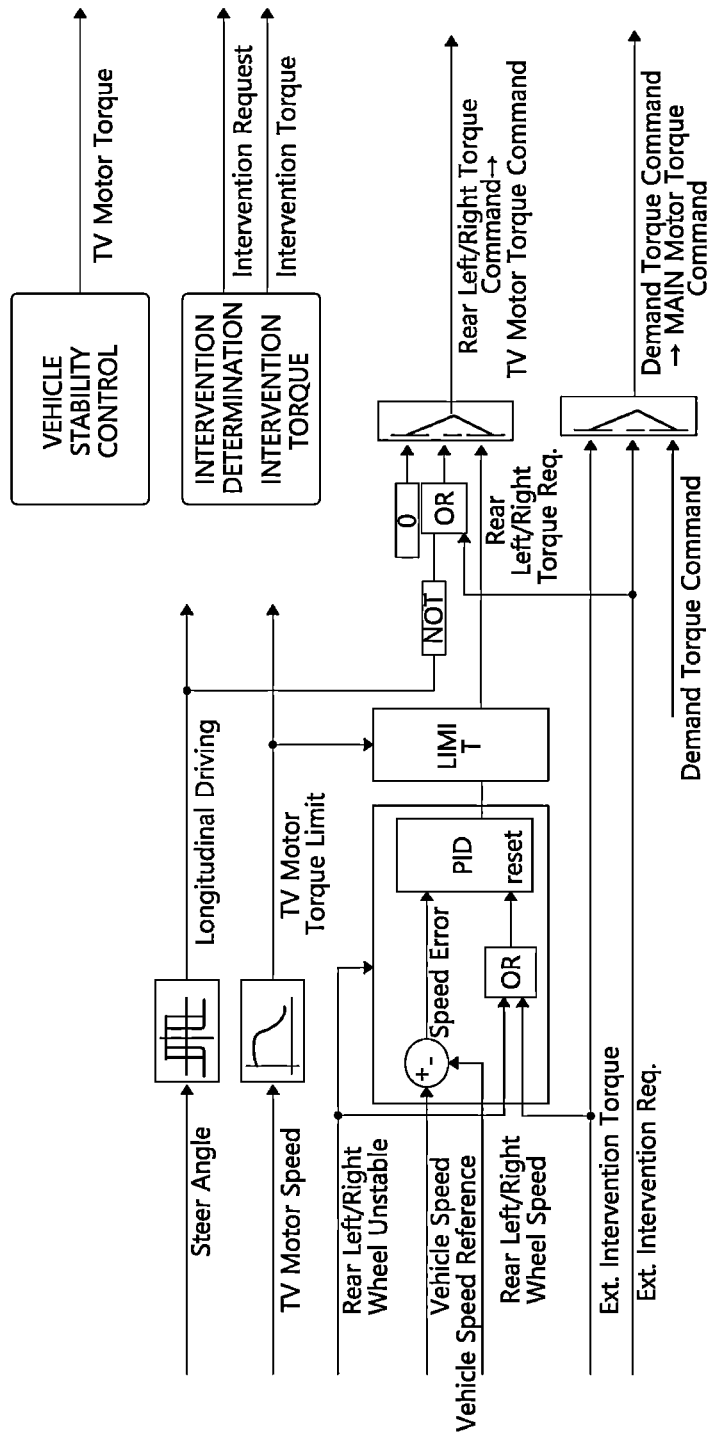

FIG. 4 and FIG. 5 are diagrams illustrating a vehicle control unit according to various exemplary embodiments of the present disclosure.

Referring to FIG. 4 and FIG. 5, the vehicle control unit according to various exemplary embodiments of the present disclosure may estimate the speed of a vehicle, may determine the state of the vehicle by analyzing the state of the vehicle based on the estimated vehicle speed, and may control stability of the vehicle using the torques of torque vectoring motors based on result values obtained by analysis.

An xEV may estimate a vehicle speed through front wheel speeds, rear wheel speeds, an acceleration, a motor speed, etc. under the control of a vehicle control unit. The vehicle control unit may be referred to as a processor. The front wheel speed is the speed of a front wheel, the rear wheel speed is the speed of a rear wheel, and the motor speed is the speed of a motor.

For example, the xEV may estimate the vehicle speed through the front and rear wheel speeds, the motor speed and a vehicle acceleration under the control of the vehicle control unit.

Estimation of the vehicle speed through the front and rear wheel speeds may be achieved by assuming that there is no problem with the front and rear wheel speeds. Furthermore, estimation of the vehicle speed through the front and rear wheel speeds may be divided into a 2WD system and a 4WD system.

For example, in case of the 2WD system, the xEV may estimate the vehicle speed through the average speed of the speeds of non-driven wheels under the control of the vehicle control unit (VCU). In case of the 4WD system, the xEV may estimate the vehicle speed through the average speed of the speeds of all wheels or may estimate the vehicle speed through the minimum speed out of the speeds of all the wheels under the control of the vehicle control unit (VCU).

Estimation of the vehicle speed through the motor speed may be achieved by assuming that there is no failure of a motor speed sensor. The xEV may estimate the vehicle speed by multiplying the speed of the main driving motor by K under the control of the vehicle control unit (VCU). Here, K may be a natural number which is greater than 0.

In case of estimation of the vehicle speed through the vehicle acceleration, the vehicle speed may be estimated by determining the vehicle acceleration based on the accelerator pedal value detected by the acceleration sensor.

The xEV may estimate the vehicle state based on the estimated vehicle speed, the front wheel speeds, the rear wheel speeds and the steering angle under the control of the vehicle control unit (VCU).

For example, the xEV may estimate the vehicle state by comparing the wheel speeds with the vehicle speed determined through the front and rear wheel speeds, comparing the wheel speeds with the vehicle speed determined through the motor speed, or comparing the wheel speeds with the vehicle speed determined through the vehicle acceleration under the control of the vehicle control unit (VCU).

The xEV may estimate the vehicle state by comparing the wheel speeds with the vehicle speed determined through the front and rear wheel speeds under the control of the vehicle control unit (VCU).

In case that the xEV is a 2WD vehicle, the xEV may determine that the left rear wheel is stable when a difference between the vehicle speed and the speed of the left rear wheel is equal to or less than a boundary value under the control of the vehicle control unit (VCU). Here, the boundary value may be a predetermined reference vehicle speed or a predetermined reference wheel speed. The reference vehicle speed or the reference wheel speed may be set to an average speed based on vehicle wheels or wheel speeds of the xEV obtained while driving.

The xEV may determine that the left rear wheel is unstable when the difference between the vehicle speed and the speed of the left rear wheel is greater than the boundary value under the control of the vehicle control unit (VCU).

In case that the xEV is a 2WD vehicle, the xEV may determine that the right rear wheel is stable when a difference between the vehicle speed and the speed of the right rear wheel is equal to or less than the boundary value under the control of the vehicle control unit (VCU). The xEV may determine that the right rear wheel is unstable when the difference between the vehicle speed and the speed of the right rear wheel is greater than the boundary value under the control of the vehicle control unit (VCU).

In case that the xEV is a 4WD vehicle, the xEV may determine that the left rear wheel is stable when a difference between the vehicle speed and the speed of the left rear wheel is equal to or less than the boundary value under the control of the vehicle control unit (VCU). The xEV may determine that the left rear wheel is unstable when the difference between the vehicle speed and the speed of the left rear wheel is greater than the boundary value under the control of the vehicle control unit (VCU).

In case that the xEV is a 4WD vehicle, the xEV may determine that the right rear wheel is stable when a difference between the vehicle speed and the speed of the right rear wheel is equal to or less than the boundary value under the control of the vehicle control unit (VCU). The xEV may determine that the right rear wheel is unstable when the difference between the vehicle speed and the speed of the right rear wheel is greater than the boundary value under the control of the vehicle control unit (VCU).

The xEV may estimate the vehicle state by comparing the wheel speeds with the vehicle speed determined through the motor speed under the control of the vehicle control unit (VCU).

In case that the xEV is a 2WD or 4WD vehicle, the xEV may determine that the left rear wheel is stable when a difference between the vehicle speed and the speed of the left rear wheel is equal to or less than the boundary value under the control of the vehicle control unit (VCU). The xEV may determine that the left rear wheel is unstable when the difference between the vehicle speed and the speed of the left rear wheel is greater than the boundary value under the control of the vehicle control unit (VCU).

In case that the xEV is a 2WD or 4WD vehicle, the xEV may determine that the right rear wheel is stable when a difference between the vehicle speed and the speed of the right rear wheel is equal to or less than the boundary value under the control of the vehicle control unit (VCU). The xEV may determine that the right rear wheel is unstable when the difference between the vehicle speed and the speed of the right rear wheel is greater than the boundary value under the control of the vehicle control unit (VCU).

The xEV may estimate the vehicle state by comparing the wheel speeds with the vehicle speed determined through the vehicle acceleration under the control of the vehicle control unit (VCU).

In case that the xEV is a 2WD or 4WD vehicle, the xEV may determine that the left rear wheel is stable when a difference between the vehicle speed and the speed of the left rear wheel is equal to or less than the boundary value under the control of the vehicle control unit (VCU). The xEV may determine that the left rear wheel is unstable when the difference between the vehicle speed and the speed of the left rear wheel is greater than the boundary value under the control of the vehicle control unit (VCU).

In case that the xEV is a 2WD or 4WD vehicle, the xEV may determine that the right rear wheel is stable when a difference between the vehicle speed and the speed of the right rear wheel is equal to or less than the boundary value under the control of the vehicle control unit (VCU). The xEV may determine that the right rear wheel is unstable when the difference between the vehicle speed and the speed of the right rear wheel is greater than the boundary value under the control of the vehicle control unit (VCU).

Upon determining that the left rear wheel is unstable, as described above, the xEV may control the torque of the main driving motor or the torque of the corresponding torque vectoring (TV) motor to reduce the difference between the vehicle speed and the speed of the left rear wheel under the control of the vehicle control unit (VCU), as shown in FIG. 5. Here, the vehicle control unit (VCU) may initialize control of the right rear wheel when the xEV enters the unstable state of the left rear wheel, being configured for preventing unnecessarily excessive torque output.

Furthermore, upon determining that the right rear wheel is unstable, the xEV may control the torque of the main driving motor or the torque of the corresponding torque vectoring (TV) motor to reduce the difference between the vehicle speed and the speed of the right rear wheel under the control of the vehicle control unit (VCU), as shown in FIG. 5. Here, the vehicle control unit (VCU) may initialize control of the left rear wheel when the xEV enters the unstable state of the right rear wheel, being configured for preventing unnecessarily excessive torque output.

When control through the main driving motor or the torque vectoring (TV) motor is performed in the present way, a point in time when initialization of an integrator is required may be substantially the same as a point in time when a target speed is determined due to characteristics of the vehicle control unit (VCU) including the structure of a PID controller.

Figure 6:
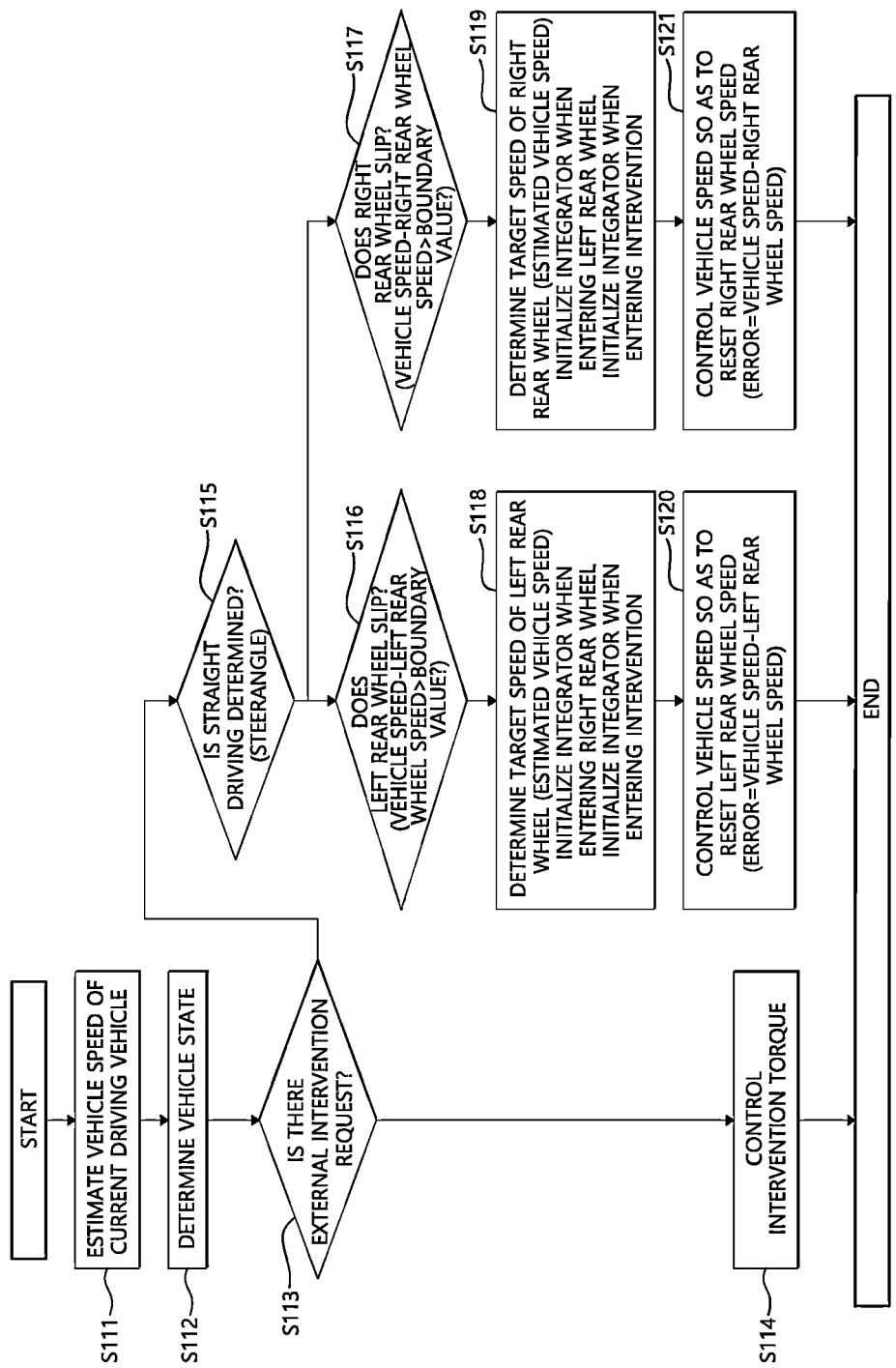
FIG. 6 is a flowchart representing a method for controlling torque vectoring of an xEV according to various exemplary embodiments of the present disclosure.

FIG. 6 is a flowchart representing a method for controlling torque vectoring of an xEV according to various exemplary embodiments of the present disclosure.

Referring to FIG. 6, the method for controlling torque vectoring of the xEV according to various exemplary embodiments of the present disclosure will be described as follows.

First, vehicle information may be detected using speed sensors mounted in the xEV, and the vehicle speed of the xEV, which is driving now, may be estimated based on the detected vehicle information (S111). Here, the vehicle information may include at least one of front and rear wheel speeds of the xEV, a main motor speed of the xEV, or an acceleration of the xEV.

For example, the xEV may estimate the vehicle speed by detecting at least one of front wheel speeds, rear wheel speeds, the main motor speed or the vehicle acceleration through the speed sensors under the control of a processor. That is, the xEV may estimate the vehicle speed based on the front and rear wheel speeds, the vehicle speed based on the motor speed, or the vehicle speed based on the vehicle acceleration under the control of the processor. Here, the processor may be referred to as a vehicle control unit (VCU).

Thereafter, the state of the xEV may be determined based on the estimated vehicle speed (S112). For example, in the determination of the state of the xEV (S112), wheel speeds may be compared with the vehicle speed estimated or determined based on the front and rear wheel speeds, may be compared with vehicle speed estimated or determined based on the motor speed, or may be compared with the vehicle speed estimated or determined based on the vehicle acceleration.

In the determination of the state of the xEV (S112), the estimated vehicle speed may be compared with a predetermined reference wheel speed, and the xEV may be determined as being in a first state in which the xEV is stable when the estimated vehicle speed is less than the predetermined reference wheel speed. On the other hand, in the determination of the state of the xEV (S112), the estimated vehicle speed may be compared with a predetermined reference wheel speed, and the xEV may be determined as being in a second state in which the xEV is unstable when the estimated vehicle speed is greater than the predetermined reference wheel speed.

That is, in the determination of the state of the xEV (S112), whether the xEV is stable may be determined based on rapid responsiveness under the control of the processor.

For example, in the determination of the state of the xEV (S112), the wheel speeds may be compared with the vehicle speed estimated based on the front and rear wheel speeds, may be compared with the vehicle speed estimated based on the motor speed, or may be compared with the vehicle speed estimated based on the vehicle acceleration.

The processor is configured to determine whether or not the xEV is in the unstable state by comparing the wheel speeds with the vehicle speed estimated based on the front and rear wheel speeds. For example, in case that the xEV is a 2WD vehicle, the processor is configured to determine that the left rear wheel is unstable when a difference between the vehicle speed and the speed of the left rear wheel is greater than a boundary value, and may determine that the right rear wheel is unstable when a difference between the vehicle speed and the speed of the right rear wheel is greater than the boundary value. In case that the xEV is a 4WD vehicle, the processor is configured to determine that the left rear wheel is unstable when the difference between the vehicle speed and the speed of the left rear wheel is greater than the boundary value, and may determine that the right rear wheel is unstable when the difference between the vehicle speed and the speed of the right rear wheel is greater than the boundary value. Here, the boundary value may be a predetermined reference vehicle speed or a predetermined reference wheel speed. The reference vehicle speed or the reference wheel speed may be set to an average speed based on vehicle wheels or wheel speeds of the xEV obtained while driving.

Furthermore, the processor is configured to determine whether or not the xEV is in the unstable state by comparing the wheel speeds with the vehicle speed estimated based on the motor speed. For example, in case that the xEV is a 2WD or 4WD vehicle, the processor is configured to determine that the left rear wheel is unstable when the difference between the vehicle speed and the speed of the left rear wheel is greater than the boundary value, and may determine that the right rear wheel is unstable when the difference between the vehicle speed and the speed of the right rear wheel is greater than the boundary value.

Furthermore, the processor is configured to determine whether or not the xEV is in the unstable state by comparing the wheel speeds with the vehicle speed estimated based on the vehicle acceleration. For example, in case that the xEV is a 2WD or 4WD vehicle, the processor is configured to determine that the left rear wheel is unstable when the difference between the vehicle speed and the speed of the left rear wheel is greater than the boundary value, and may determine that the right rear wheel is unstable when the difference between the vehicle speed and the speed of the right rear wheel is greater than the boundary value.

Thereafter, whether or not there is an intervention request may be determined based on the determined state of the xEV (S113). The determination as to whether or not there is the intervention request (S113) may include determining whether or not an intervention entry condition is satisfied and determining whether or not the intervention request is approved.

In the determination as to whether or not the intervention entry condition is satisfied, it may be determined that the intervention entry condition is not satisfied when the determined xEV is in the first state in which the xEV is stable, and it may be determined that the intervention entry condition is satisfied when the xEV is in the second state in which the xEV is unstable, under the control of the processor. For example, the xEV may make a request for intervention to a traction control system (TCS), upon determining that the intervention entry condition is satisfied (S114).

In the determination as to whether or not the intervention request is approved, when the xEV is in the second state, the intervention request may be approved when the state of the xEV deviates from a predetermined controllable range, and the intervention request may be rejected when the state of the xEV does not deviate from the predetermined controllable range. Here, the processor is configured to determine that the state of the xEV is within the controllable range when an intervention torque and a demand torque are the same, and may determine that the state of the xEV is not within the controllable range when the intervention torque and the demand torque are different. That is, the predetermined controllable range may be set by the intervention torque and the demand torque.

The xEV may approve the intervention request, and may control the intervention torque, when the state of the xEV deviates from the predetermined controllable range under the control of the processor. The traction control system (TCS) of the xEV may make a request for the intervention torque to the vehicle control unit (VCU) and thus reduce a torque for driving, being configured for preventing occurrence of slip and thus securing drivability for power transmission.

Thereafter, when the intervention request is rejected, the steering angle of the xEV may be detected (S115). In the detecting of the steering angle (S115), operation of steering wheel may be detected, and the steering angle may be detected or determined based on the detected operation of the steering wheel.

In the detecting of the steering angle (S115), the xEV may be determined as being in a first slip state in which the xEV slips in the longitudinal direction, when the steering angle of the xEV detected under the control of the processor is within a predetermined reference angle range, and the xEV may be determined as being in a second slip state in which the xEV slips in the lateral direction, when the detected steering angle of xEV deviates from the predetermined reference angle range.

Upon determining that the xEV is in the second slip state under control of the processor, the xEV may perform traction control.

Upon determining that the xEV is in the first slip state, the vehicle speed of the xEV may be reset through outputs of torque vectoring (TV) motors mounted in the xEV.

The reset of the vehicle speed may include estimating a wheel which slips, determining a target speed, and controlling the vehicle speed.

In the estimation of the slipping wheel, the front wheel speed or the rear wheel speed may be detected by the speed sensor under the control of the processor, and slip or non-slip of the wheel may be estimated by comparing the detected wheel speed with a reference error range (S116 and S117).

In the estimation of the slipping wheel (S116 and S117), slip or non-slip of the respective wheels of the xEV may be estimated. For example, the wheels of the xEV may include first to fourth wheels. Here, the first wheel may be expressed as a left front wheel, the second wheel may be expressed as a right front wheel, the third wheel may be expressed as a left rear wheel, and the fourth wheel may be expressed as a right rear wheel.

For example, in the estimation of the slipping wheel (S116 and S117), the left rear wheel may be estimated to slip when a difference between a current speed vehicle and the speed of the left rear wheel deviates from the reference error range (S116), and the right rear wheel may be estimated to slip when a difference between the current speed vehicle and the speed of the right rear wheel deviates from the reference error range (S117). The present disclosure is not limited thereto, and in the estimation of the slipping wheel (S116 and S117), the left front wheel may be estimated to slip when a difference between the current speed vehicle and the speed of the left front wheel deviates from the reference error range, and the right front wheel may be estimated to slip when a difference between the current speed vehicle and the speed of the right front wheel deviates from the reference error range.

In contrast, in the estimation of the slipping wheel (S116 and S117), it may be estimated that each of the first to fourth wheels is in the nonslip state when a difference between the vehicle speed and the speed of each of the first to fourth wheels is within the reference error range.

Thereafter, the target speed of the wheel estimated to slip may be determined (S118 and S119). For example, in the determination of the target speed of the wheel estimated to slip (S118 and S119), when the target speed of the left rear wheel is determined under the control of the processor, an integrator when entering the right rear wheel and the integrator when entering intervention may be controlled to be initialized (S118), and when the target speed of the right rear wheel is determined under the control of the processor, the integrator when entering the left rear wheel and the integrator when entering intervention may be controlled to be initialized (S119). Otherwise, when the target speed of the left front wheel is determined, the integrator when entering the right front wheel and the integrator when entering intervention may be controlled to be initialized, and when the target speed of the right front wheel is determined under the control of the processor, the integrator when entering the left front wheel and the integrator when entering intervention may be controlled to be initialized.

As described above, the processor may initialize the integrator when entering the right rear wheel and the integrator when entering intervention, being configured for preventing unnecessarily excessive torque output.

Here, in case that control through the torque vectoring (TV) motor or the electric motor is performed, a point in time when initialization of the integrator is required may be substantially the same as a point in time when the target speed is determined due to characteristics of the vehicle control unit (VCU) including the structure of a PID controller.

Thereafter, the vehicle speed may be controlled to reset the speed of the wheel based on the determined target speed (S120 and S121). For example, in the control of the vehicle speed (S120 and S121), when the target speed of the left rear wheel is determined under the control of the processor, the vehicle speed may be controlled to reset the left rear wheel speed based on the determined target speed of the left rear wheel (S120), and when the target speed of the right rear wheel is determined, the vehicle speed may be controlled to reset the right rear wheel speed based on the determined target speed of the right rear wheel (S121). Otherwise, when the target speed of the left front wheel is determined under the control of the processor, the vehicle speed may be controlled to reset the left front wheel based on the determined target speed of the left front wheel, and when the target speed of the right front wheel is determined, the vehicle speed may be controlled to reset the right front wheel based on the determined target speed of the right front wheel.

As described above, in the reset of the vehicle speed, when the xEV is in the first state in which the xEV is stable due to the current vehicle speed, which is reset under the control of the processor, the xEV may be controlled to maintain the current vehicle speed.

In contrast, in the reset of the vehicle speed, when the xEV is in the second state in which the xEV is unstable due to the current vehicle speed, which is reset after initialization of vehicle speed information under the control of the processor, the xEV may be controlled to reset the current vehicle speed.

The present disclosure described above may be implemented as computer readable code in a computer readable recording medium in which programs are recorded. Such computer readable recording media may include all kinds of recording media in which data readable by computer systems is stored. For example, the computer readable recording media may include a Hard Disk Drive (HDD), a solid-state drive (SSD), a silicon disk drive (SDD), a ROM, a RAM, a CD-ROM, a magnetic tape, a floppy disk, an optical data storage device, etc.

As is apparent from the above description, a method and apparatus of controlling torque vectoring of an xEV according to at least various exemplary embodiments of the present disclosure may control stability in traction through application of a torque vectoring-dedicated motor system, and may improve ride comfort through rapid determination of a vehicle state using motor dynamic characteristics.

Furthermore, the method and apparatus of controlling torque vectoring of the xEV according to at least various exemplary embodiments of the present disclosure may improve traction control performance, and may secure control stability through improvement in reliability in vehicle speed estimation.

Furthermore, the method and apparatus of controlling torque vectoring of the xEV according to at least various exemplary embodiments of the present disclosure may secure control performance through improvement in dynamic characteristics for vehicle speed estimation.

Moreover, the method and apparatus of controlling torque vectoring of the xEV according to at least various exemplary embodiments of the present disclosure may achieve cost reduction through improvement in control software without separate development cost.

In an exemplary embodiment of the present invention, each operation described above may be performed by a control device, and the control device may be configured by multiple control devices, or an integrated single control device.

In an exemplary embodiment of the present invention, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling torque vectoring of a vehicle, the method comprising:
   detecting, by a controller, vehicle speed information using speed sensors mounted in the vehicle, and estimating, by the controller, a vehicle speed of the vehicle in driving according to the detected vehicle speed information;
   setting, by the controller, a state of the vehicle based on the estimated vehicle speed;
   determining, by the controller, whether an intervention request occurs according to the set state of the vehicle;
   detecting, by the controller, a steering angle of the vehicle when the intervention request is rejected; and when the detected steering angle of the vehicle is within a predetermined reference angle range, determining, by the controller, the vehicle as being in a first slip state in which the vehicle slips in a longitudinal direction, and resetting, by the controller, the vehicle speed of the vehicle through controlling an output of a torque vectoring (TV) motor mounted in the vehicle.

2. The method of claim 1, wherein the determining the state of the vehicle includes:
comparing the estimated vehicle information with a predetermined reference wheel speed;
determining the vehicle as being in a first state in which the state of the vehicle is stable, when the controller concludes that the estimated vehicle speed information is less than the predetermined reference wheel speed; and
determining the vehicle as being in a second state in which the state of the vehicle is unstable, when the controller concludes that the estimated vehicle speed information is greater than the predetermined reference wheel speed.

3. The method of claim 1, wherein the vehicle speed information includes at least one of front and rear wheel speeds of the vehicle, a motor speed of the vehicle, or an acceleration of the vehicle.

4. The method of claim 2, wherein the determining whether the intervention request occurs includes:
approving the intervention request, when the controller concludes that the state of the vehicle deviates from a predetermined controllable range; and
rejecting the intervention request, when the controller concludes that the state of the vehicle is within the predetermined controllable range.

5. The method of claim 4, further including, after the detecting the steering angle:
when the detected steering angle of the vehicle deviates from the predetermined reference angle range, determining, by the controller, the vehicle as being in a second slip state in which the vehicle slips in a lateral direction, and performing, by the controller, traction control.

6. The method of claim 2, wherein the resetting the vehicle speed of the vehicle includes:
when a difference between the vehicle speed of the vehicle and a speed of a left rear wheel of the vehicle deviates from a reference error range, estimating the left rear wheel of the vehicle to slip; and
when a difference between the vehicle speed of the vehicle and a speed of a right rear wheel of the vehicle deviates from the reference error range, estimating the right rear wheel of the vehicle to slip.

7. The method of claim 6, wherein the resetting the vehicle speed of the vehicle further includes:
when the left rear wheel of the vehicle is estimated to slip, initializing information regarding the right rear wheel of the vehicle.

8. The method of claim 6, wherein the resetting the vehicle speed of the vehicle further includes:
when the right rear wheel of the vehicle is estimated to slip, initializing information regarding the left rear wheel of the vehicle.

9. The method of claim 8, wherein the resetting the vehicle speed of the vehicle further includes:
when the vehicle is in the first state in which the state of the vehicle is stable due to a current vehicle speed reset after the initializing the information, controlling the vehicle to maintain the current vehicle speed.

10. A non-transitory computer readable recording medium including recorded thereon a program to execute the method of claim 1.

11. An apparatus of controlling torque vectoring of a vehicle, the apparatus comprising:
a vehicle control unit configured to estimate a vehicle speed of the vehicle and a state of the vehicle using speed sensors mounted in the vehicle;
a motor control unit configured to receive a motor torque command from the vehicle control unit and to control a torque of a motor; and
a traction control system configured to estimate the state of the vehicle and to form a request for intervention to the vehicle control unit based on the estimated state of the vehicle,
wherein the vehicle control unit is configured to:
determine whether an intervention request occurs according to a set state of the vehicle, and detect a steering angle of the vehicle when the intervention request is rejected; and
when the detected steering angle of the vehicle is within a predetermined reference angle range, determine the vehicle as being in a first slip state in which the vehicle slips in a longitudinal direction, and reset the vehicle speed of the vehicle through controlling an output of a torque vectoring (TV) motor mounted in the vehicle.

12. The apparatus of claim 11, wherein the vehicle control unit is configured to detect vehicle speed information using the speed sensors, to estimate the vehicle speed of the vehicle in driving based on the detected vehicle speed information, and to set the state of the vehicle based on the estimated vehicle speed to determine the set state of the vehicle.

13. The apparatus of claim 12, wherein the vehicle control unit is configured to:
compare the estimated vehicle information with a predetermined reference wheel speed;
determine the vehicle as being in a first state in which the state of the vehicle is stable, when the estimated vehicle speed information is less than the predetermined reference wheel speed; and
determine the vehicle as being in a second state in which the state of the vehicle is unstable, when the estimated vehicle speed information is greater than the predetermined reference wheel speed.

14. The apparatus of claim 13, wherein the vehicle control unit is configured to approve the intervention request, when the state of the vehicle deviates from a predetermined controllable range, and to reject the intervention request, when the state of the vehicle is within the predetermined controllable range.

15. The apparatus of claim 14, wherein the vehicle control unit is configured to determine the vehicle as being in a second slip state in which the vehicle slips in a lateral direction, and to perform traction control, when the detected steering angle of the vehicle deviates from the predetermined reference angle range.

16. The apparatus of claim 15, wherein the vehicle control unit is configured to:
estimate a left rear wheel of the vehicle to slip, when a difference between the vehicle speed of the vehicle and a speed of the left rear wheel of the vehicle deviates from a reference error range; and
estimate a right rear wheel of the vehicle to slip, when a difference between the vehicle speed of the vehicle and a speed of the right rear wheel of the vehicle deviates from the reference error range.

17. The apparatus of claim 16, wherein the vehicle control unit is configured to initialize information regarding the right rear wheel of the vehicle, when the left rear wheel of the vehicle is estimated to slip.

18. The apparatus of claim 16, wherein the vehicle control unit is configured to initialize information regarding the left rear wheel of the vehicle, when the right rear wheel of the vehicle is estimated to slip.

19. The apparatus of claim 18, wherein, when the vehicle is in the first state in which the state of the vehicle is stable due to a current vehicle speed reset after the initializing the information, the vehicle control unit is configured to control the vehicle to maintain the current vehicle speed.

* * * * *